United States Patent
Saha et al.

(10) Patent No.: US 11,227,119 B2
(45) Date of Patent: Jan. 18, 2022

(54) COGNITIVE WORD PROCESSING

(71) Applicant: INTERNATIONAL BUSINESS MACHINES CORPORATION, Armonk, NY (US)

(72) Inventors: Chanchal Saha, Beacon, NY (US); Richard B. Finch, New Palz, NY (US); Thembani Togwe, Lenexa, KS (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 249 days.

(21) Appl. No.: 16/517,577

(22) Filed: Jul. 20, 2019

(65) Prior Publication Data

US 2021/0019371 A1  Jan. 21, 2021

(51) Int. Cl.
*G06F 40/30* (2020.01)
*G06F 40/247* (2020.01)
*G06F 40/253* (2020.01)

(52) U.S. Cl.
CPC ............ *G06F 40/30* (2020.01); *G06F 40/247* (2020.01); *G06F 40/253* (2020.01)

(58) Field of Classification Search
None
See application file for complete search history.

(56) References Cited

U.S. PATENT DOCUMENTS

| | | | |
|---|---|---|---|
| 6,527,812 B1 | 3/2003 | Bradstreet | |
| 9,043,265 B2 | 5/2015 | Michelin | |
| 10,083,168 B1* | 9/2018 | Armitage | G06F 40/30 |
| 10,594,757 B1* | 3/2020 | Shevchenko | G06F 40/186 |

(Continued)

FOREIGN PATENT DOCUMENTS

CN  103294657 B  10/2018

OTHER PUBLICATIONS

Chen, Mia Xu, Benjamin N. Lee, Gagan Bansal, Yuan Cao, Shuyuan Zhang, Justin Lu, Jackie Tsay et al. "Gmail smart compose: Real-time assisted writing." In Proceedings of the 25th ACM SIGKDD International Conference on Knowledge Discovery & Data Mining, pp. 2287-2295. 2019. (Year: 2019).*

(Continued)

*Primary Examiner* — Frank D Mills
(74) *Attorney, Agent, or Firm* — Gregory M. Nordstrom (57) ABSTRACT

A method comprises computing an articulation rating associated with an input text, generating a modified subtext to modify a candidate subtext of the input text, generating an enhanced text that includes the modified subtext, computing an articulation rating associated with the enhanced text, and, based on the articulation rating associated with the enhanced text improving over the articulation rating associated with the input text, outputting the enhanced text. The method can include computing a meaning and/or relevance score associated with a candidate subtext of the input text, computing a meaning and/or relevance score associated with a modified subtext, and, based on one or both of the second scores improving over the respective first scores, generating the enhanced text to include the modified text. A word processing system, comprising a computerized input text, computerized attributes, and a computer-implemented word processor, can perform operations of the method.

20 Claims, 5 Drawing Sheets

(56) References Cited

U.S. PATENT DOCUMENTS

| | | | | |
|---|---|---|---|---|
| 10,922,483 | B1* | 2/2021 | Shevchenko | G06F 40/20 |
| 2014/0379324 | A1 | 12/2014 | Klapaftis et al. | |
| 2015/0242391 | A1* | 8/2015 | Goel | G06F 40/30 |
| | | | | 704/9 |
| 2016/0147760 | A1* | 5/2016 | N | G06Q 50/01 |
| | | | | 707/751 |
| 2016/0364380 | A1* | 12/2016 | Korn | G06F 40/166 |
| 2017/0124593 | A1* | 5/2017 | Nickerson | G06Q 30/0263 |
| 2017/0330559 | A1* | 11/2017 | Korn | G06F 40/253 |
| 2017/0344530 | A1 | 11/2017 | Krasadakis | |
| 2018/0032500 | A1* | 2/2018 | DeLuca | G06F 40/151 |
| 2018/0285339 | A1* | 10/2018 | Bostick | G06F 40/253 |
| 2019/0272322 | A1* | 9/2019 | De Ridder | G06F 16/9538 |
| 2019/0272325 | A1* | 9/2019 | Korn | G06F 40/166 |
| 2019/0361720 | A1* | 11/2019 | Balachandran | G06F 40/253 |
| 2020/0167524 | A1* | 5/2020 | Hunter | G09B 7/02 |
| 2020/0327189 | A1* | 10/2020 | Li | G06F 40/56 |

OTHER PUBLICATIONS

Chachal Saha, et al;A decision support system for real-time order management in a heterogeneous production environment;http://www.elsevier.com/locate/eswa; Apr. 29, 2016; Expert Systems with Applications vol. 60 (2016) 16-26.

* cited by examiner

COGNITIVE WORD PROCESSING

BACKGROUND

The present disclosure relates to computerized word processing, and more specifically, to enhancing editing and writing features of a computer-implemented word processing system.

SUMMARY

According to the present disclosure (hereinafter, "the disclosure"), embodiments of the disclosure (hereinafter, "embodiments") can include a method that can output an enhanced text based on an input text. The method comprises a computer-implemented word processing system computing an articulation rating associated with an input text. In embodiments the word processing system computes the articulation rating based on rhetorical attributes associated with the input text, audience attributes associated with the input text, and author attributes associated with an author of the input text.

In embodiments the method further comprises the word processing system selecting, from the input text, a candidate subtext and generating a modified subtext that modifies the candidate subtext. The word processing further generates an enhanced text, based on the input text, that includes the modified subtext. According to the method, the word processing system computes rhetorical attributes associated with the enhanced text and, based on the rhetorical attributes associated with the enhanced text, and the audience and author attributes associated with the input text, the word processing system computes an articulation rating associated with the enhanced text. Based on the articulation rating associated with the enhanced text improving over the articulation rating associated with the input text, the word processing system outputs the enhanced text.

In some embodiments the method further includes the word processing system computing one or both of a meaning and a relevance score. In an embodiment the meaning score can correspond to a natural language meaning of a candidate sentence that includes the candidate subtext, and the relevance score can correspond to a natural language relevance of the candidate subtext to one or both of the candidate sentence and a paragraph of the input text includes the candidate sentence. According to the method, the word processing system generates a modified sentence comprising the candidate sentence including the modified subtext. The word processing system computes one or both of a second meaning and a second relevance score. In embodiments the second meaning score can correspond to a natural language meaning of the modified sentence. The second relevance score can correspond to a natural language relevance of the modified subtext to one or both of the modified sentence and the paragraph of the input text having the modified sentence substituting for the candidate sentence. In accordance with the method, the based on one or both of the second meaning and second relevance scores improving over the first meaning and relevance scores, the word processing system generates the enhanced text to include the modified subtext.

Embodiments can include a word processing system that includes a computerized input text, computerized text attributes, and a computer-implemented word processor. The computerized text attributes can comprise rhetorical attributes associated with the input text, audience attributes associated with an audience of the input text, and author attributes associated with an author of the input text. The word processing system can be configured to perform operations of the method, In particular, the word processing system can compute an articulation rating associated with the input text, generate a modified subtext to modify a candidate subtext of the input text, generate an enhanced text that includes the modified subtext, compute an articulation rating associated with the enhanced text, and, based on the articulation rating associated with the enhanced text improving over the articulation rating associated with the input text, output the enhanced text.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure (hereinafter, "the disclosure) and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the disclosure.

DETAILED DESCRIPTION

Aspects of the present disclosure (hereinafter, "the disclosure") relate to word processing in documents, more particular aspects relate to enhancing features of word processing systems and enhancing content of documents by a word processing system. While the disclosure is not necessarily limited to such applications, various aspects of the disclosure may be appreciated through a discussion of various examples using this context.

In embodiments of the disclosure (hereinafter, "embodiments"), a word processing system can operate on an input text (e.g., a text input to, and/or processed by, a word processing system) to modify that text. As used herein, an "input text" can comprise any electronic and/or computerized form of a natural language document, such as an email, a text message, or a document file (e.g., an electronic file containing a natural language document), and/or a "subtext" component of a larger text. In embodiments, a text can include "electronic elements" that can be represented, in a text, in an electronic or computerized form, such as hyperlinks and media files. A "subtext", in an embodiment, can be a selectively identifiable component of a larger text, such as a word, phrase, sentence, paragraph, punctuation or grammatical element, graphical or symbol element, and/or electronic element within a text.

In embodiments a computerized word processing system (or, a word processing "application" of a computing system) can comprise various elements, such as hardware and/or software components, that can perform function such as displaying a text, editing a text, analyzing a text, formatting a text, and/or outputting a text in its original or a modified form. As used herein, "word processor" refers to a computer-implemented word processing system capable of performing such functions. For purposes of illustrating the disclosure, but not intended to limit embodiments, a "user" of a word processor can be a human and/or a computer application (e.g., a computerized application that can automate using a word processor to perform particular functions on an input text, such as an application that can use a word processor to analyze a text to identify a particular text or component of a text).

Word processors can have limitations in performing certain functions. For example, an editing function of a word processor can enable a user to select and modify a subtext of an input text, such as to replace that subtext with an alternate subtext. Such a word processor can compile a history of such changes in a text and can permit a user to "undo" a prior change. However, word processors commonly perform such an undo operation in only a most to last recent sequential order. For example, a user can (using a word processor) make a series of 3 changes, but to undo the first of the 3, the word processor can require the user to undo the third, and second changes, in that order, to subsequently undo the first change.

In another example, a word processor can enable a user to "cut", or copy, a subtext from one text and "paste" that first subtext into a second text, in place of or in addition to other subtexts within that second text. However, word processors can utilize a "clipboard" to store a cut or copied subtext (as used herein, a "clipboard copy" of a subtext), and a user can utilize only the most recent clipboard copy of a subtext to paste into one or more texts, or to paste multiple instances of that clipboard subtext into a particular text.

In an embodiment, "articulateness" of a text can include clarity of natural language meaning of a text, and/or the readability of a text, to a particular audience, or member of a larger audience body. Improving articulateness of a text, in an embodiment, can improve the ability of a text to convey natural language meaning of the text to an audience. Accordingly, in embodiments word processors can perform functions to enhance the articulateness of a text, such as by using cognitive processing to identify subtexts within a text that can be replaced with a modified subtext that can enhance, for example, the articulateness of a text. Cognitive processing, in an embodiment, can include computer processing capabilities such as machine and/or deep learning, natural language processing, and relationship and/or social network analysis. Embodiments can use such cognitive processing capabilities to determine, for example, natural language understanding (e.g., natural language meanings) of a subtext and/or a text, and/or relationships between an author of a text and an audience (e.g., a particular recipient, or recipients, of an email, or intended or anticipated recipients or readers of a document).

In embodiments, a word processor can improve, and/or assist a user to improve, the articulateness of a text by, for example, analyzing the text to identify particular "candidate" subtexts and suggesting corresponding, "modified subtexts" that can replace, or modify, the candidate subtext in an input text to produce an enhanced text. Such modified subtexts, in an enhanced text, can improve a natural language meaning of a subtext, and/or the text overall. Modified subtexts, in an enhanced text, can, for example, modify "rhetorical attributes" of a text, such as natural language meaning of a subtext, natural language meaning of a text derived, in part, from a particular subtext; a style of writing, such as an expository, descriptive, persuasive, or narrative style; and/or a rhetorical tone of a subtext or text, such as an informal or formal tone of subtext or text.

In embodiments, identifying candidate subtexts can be based on a variety of criteria. For example, in an embodiment, a word processor can identify a particular word, or phrase, within a text as a candidate subtext based on that subtext having a particular usage frequency (e.g., within the text, and/or alternative texts associated with a particular author or audience of a text), such as a usage frequency above a threshold value (e.g., the same word or phrase is repeated more than, say, 3 times within the same text). In an embodiment, using this example a word processor can suggest synonyms for a candidate word, or alternative phrases for a candidate phrase, to enhance the original text by replacing one or more instances of the candidate subtext, in the original text, with one or more of the suggested alternative subtexts.

As another example, a text can include subtexts such as word or phrase abbreviations, a symbol (e.g., a graphical, mathematical, or chemical symbol), and/or a mathematical or chemical equation. In embodiments, an input text can comprise a "primary natural language" in which a majority of the input text is expressed, and a subtext of an input text can comprise an "foreign natural language" word or phrase. For example, an input text expressed in the English language can include a subtext comprising a word or phrase in the French language. In an embodiment a word processor can identify these subtexts and suggest natural language words, or phrases, to substitute for the abbreviations, symbols, or equations, or phrases in the primary natural language of the input text to substitute for a foreign natural language subtext, in the input text to produce an enhanced text.

Accordingly, FIGS. 1-4 illustrate example methods for an embodiment to enhance an input text such as just described. For purposes of illustrating the disclosure, but not intended to limit embodiments, the examples of FIGS. 1-4 are described as performed by a computer-implemented word processor. However, it would be apparent to one of ordinary skill in the art that the methods can be performed by word processing systems other than a "word processor" as described herein.

Figure 1:
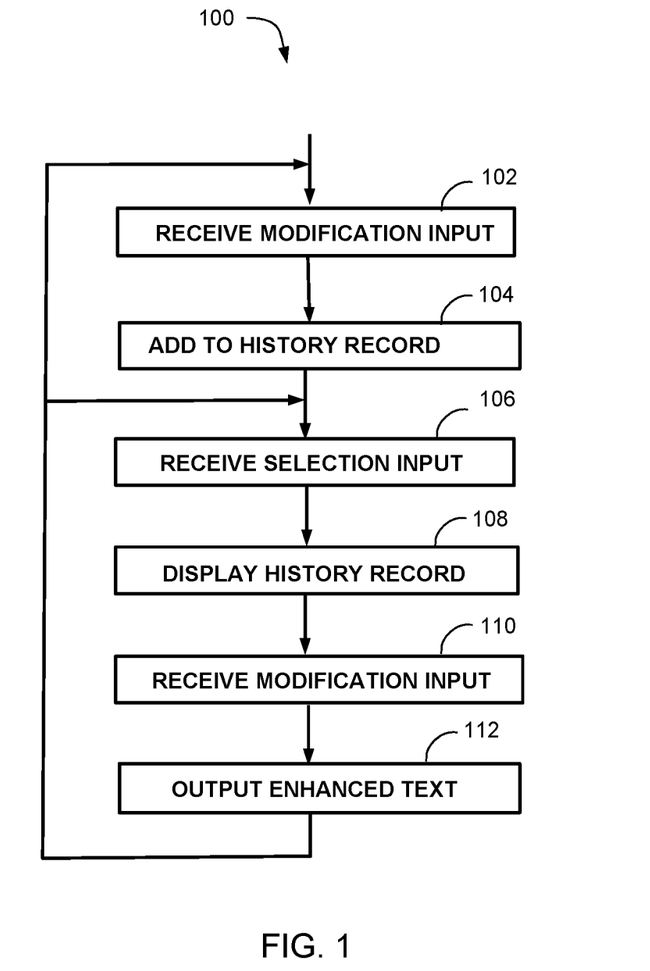
FIG. 1 illustrates an example method for modifying an input text, according to aspects of the disclosure.

Referring to FIG. 1, example method 100 illustrates a method of an embodiment to enhance the operations of a word processor to enable a user to select from a history of modifications to a document, or a history of clipboard copy operations, to modify a subtext of a text. At 102, the word processor receives an input corresponding to an operation modifying a subtext in a text, and/or an operation storing a subtext cut or copied from that same text, or an alternative text. In an embodiment, a "clip operation" that makes a clipboard copy of a subtext (e.g., cutting or copying a subtext) can be an operation of a particular computing application (e.g., a word processor, a spreadsheet program, or an Internet browser program), and that application can be an application other than a word processing application operating on a particular text and using the clipboard copy.

At 104, the word processor records the modification or clip operation in a history record. In an embodiment, the word processor can record the modification or clip operation in the history record in association with: an order the operation was performed (e.g., relative to other, similar operations); a time the modification or operation was performed; a location, within a text, where the modification or operation was performed; and/or an application that performed the operation. In an embodiment, a history record can include changes made over a particular period of time, such as from the time a text was initially created, a period of time spanning a particular set of versions of a text, or a period of time spanning the time since the text was accessed for current operations of a word processor.

At 106 the word processor receives a selection input corresponding to an input text and an operation to perform within, or upon, that text. In an embodiment, the selection input can include a type of operation, such as undo or paste, and a scope of the text (e.g., the input text as a whole, or a subtext, within the text) to which to apply the operation. For example, in an embodiment a selection input can identify a candidate subtext (e.g., a word in the input text) as the scope of the operation; alternatively, a selection input can identify an operation, such as undo or paste, and select the entire input text as the scope of the operation.

At 108 the word processor displays a history record associated with the selection input. In an embodiment, the word processor can display a subset of a history record, such as a history of all changes made to the input text, a history of changes to only a particular word, or phase, included in the selection input, or a subset of the history record spanning changes made to the input text over a particular period of time. An embodiment can display, at 108, a history of various clip operations performed by the word processor and/or alternative applications. In an embodiment a history of clip operations performed by alternative applications can include clip operations performed on a source other than the input text.

At 110, the word processor receives a modification input corresponding to an operation to perform on the input text using a change, or clip operation, included in the history displayed at 108. In an embodiment, the modification input can include a selection of a subtext within the input text and a change or clip operation included in the history. By enabling a user to select a previous change or clip operation from a history of such operations, an embodiment can enhance the editing capabilities of a word processor to overcome the limitations of serial undo operations, or use of only a most recent clip operation (e.g., a most recent clipboard cut or copy made by the word processor itself operating on an input text).

At 112 the word processor outputs the modified text. In an embodiment, the modified text output at 112 can be a modified version of a subtext, received at 106 in the modification input, or can be the input text with the subtext modified, in the input text, according to the modification input received at 110. In an embodiment, the modified text can produce an enhanced text, in that the modifications made at 110 can improve the content and/or articulateness of the original input text received at 102. Subsequent to, or in conjunction with, operation 112 the word processor can repeat operations 106 through 110, and/or 102-110.

Figure 2:
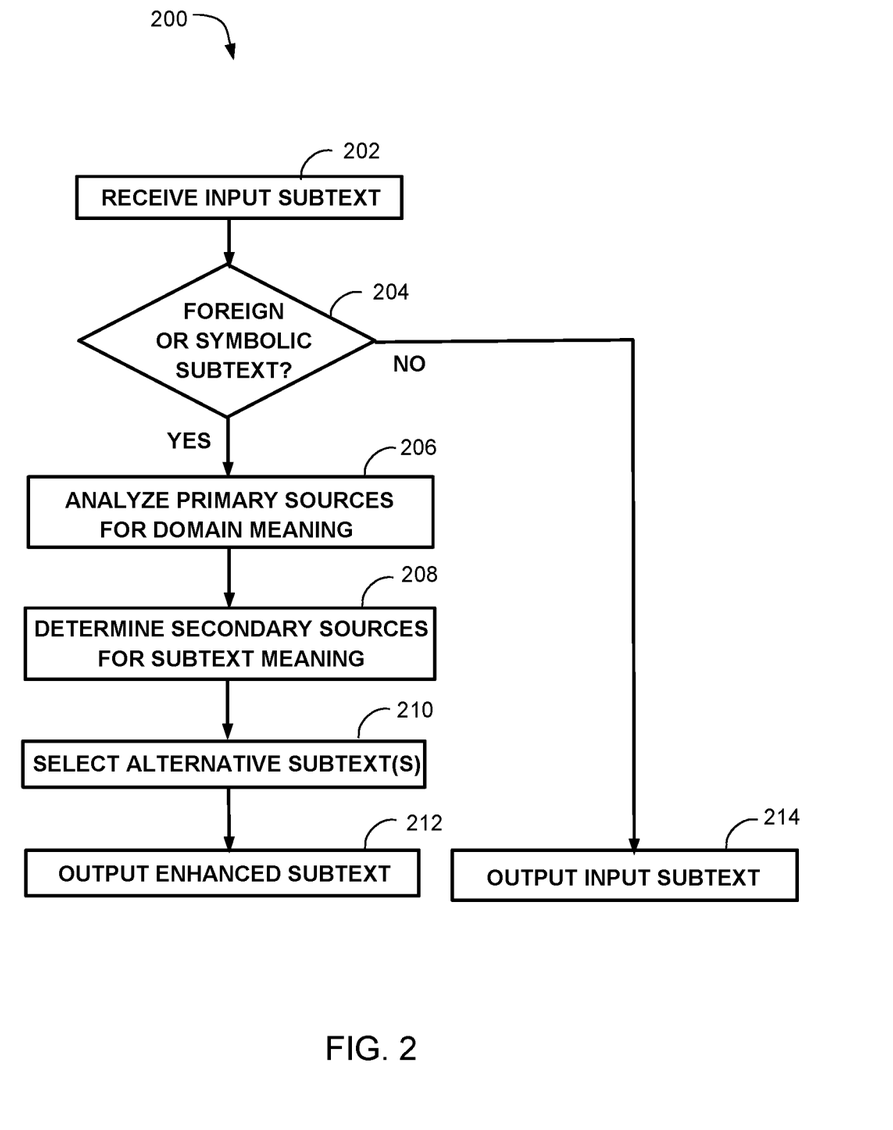
FIG. 2 illustrates an example method for modifying a subtext, according to aspects of the disclosure.

FIG. 2 illustrates another example method for enhancing an input text, in which the subtext includes a symbolic subtext and/or a foreign language word or phrase subtext. In embodiments, an input text can comprise a "primary language", which can be a natural language (e.g., the English language) in which a majority of the text is expressed. A foreign language subtext, in embodiments, can be a word, phrase, sentence, and/or paragraph of a text that is in any natural language (e.g., the French language) other than the primary language of an input text. In an embodiment, a symbolic subtext can be, for example, an abbreviation, a symbol (e.g., a graphic, mathematical, or chemical symbol or combination of such symbols), and/or a mathematical or chemical equation.

As in the description of method 100 of FIG. 1, to illustrate the example but not intended to limit embodiments, the method is described as performed by a computer-implemented word processor. In embodiments, method 200 can be performed independently or, alternatively, can be performed in combination with, and/or use outputs of, a method, such as method 100 in FIG. 1, to modify a subtext of an input text.

Referring to FIG. 2, at 202 the word processor receives an input subtext. In an embodiment, at 202 the input subtext can include a foreign language and/or symbolic subtext, such as just described. Alternatively, at 202 an embodiment can receive an input text and, at 202, can analyze the input text to identify a foreign language and/or symbolic subtext within the input text.

At 204 the word processor determines if the subtext is a foreign or symbolic subtext. In embodiments, a word processor can use, for example, question-answering computing technologies to identify a subtext as an abbreviation or foreign subtext. At 204, an embodiment can, for example, search scientific sources (e.g., on the Internet, or in a database, to search or analyze scientific or mathematical lexicons, dictionaries, treatises, and/or journals) to identify a subtext as a mathematical symbol or equation, or a chemical symbol or equation.

If, at 204, the word processor determines that the input subtext is not a foreign or symbolic subtext, at 214 the word processor outputs the input subtext received at 202. Alternatively, if the word processor determines, at 204, that the input subtext is a foreign or symbolic subtext, at 206 the word processor analyzes primary sources to determine a domain meaning of the subtext. At 206 an embodiment can, for example, use the results of 204 (e.g., that a subtext is an abbreviation or foreign subtext, and/or that a subtext is, or corresponds to, a symbolic input) to determine a domain of that subtext, such as that the subtext corresponds to a particular natural language, or to a particular mathematical or scientific field. An embodiment can, accordingly, utilize those results as inputs to identify primary sources (e.g., Internet and/or database sources) to search and/or analyze to determine a domain meaning of that subtext.

At 208 the word processor uses the results of operation 206 to determine secondary sources to search, and/or analyze, top determine alternative, natural language subtexts that can modify an input subtext received at 202. For example, in an embodiment at 208 the word processor can use natural language processing to analyze a domain, and/or domain meaning, determined at 206 to identify secondary sources (e.g., sources more particular to a domain determined at 206, which can include primary resources analyzed at 206), to refine terms to search in a primary and/or secondary source, and/or to analyze a primary and/or secondary source, to determine natural language subtexts that can modify an input subtext received at 202.

In embodiments, "modifying", an input subtext can comprise replacing a subtext, and/or an occurrence of a subtext in an input text, with a modified subtext. Additionally, or alternatively, in an embodiment "modifying" an input subtext can comprise combining a modification subtext with an input subtext so as to grammatically, and/or rhetorically, qualify an input subtext, or an occurrence of an input subtext in an input text. For example, in an embodiment a modified subtext can be an adjective or adverb, or adjectival or adverbial clause, and modifying a subtext can include combining the alternative subtext with an input subtext to modify (e.g., modify or clarify the natural language meaning of) the input subtext or an occurrence of the input subtext in an input text. In embodiments, modifying a symbolic subtext can comprise, for example, replacing the symbolic subtext with a natural language subtext, or including a natural language subtext (e.g., parenthetically, or as a clarifying subtext) with an occurrence of a symbolic subtext in an input text.

At 210 the word processor selects one or more alternative subtexts from the results of the search and/or analysis performed in operation 208. Embodiments can utilize the enhanced subtext, output at 212, to improve the articulateness of a text that includes the input subtext. For example, an embodiment can modify one or more instances of the input subtext in an input text, using the enhanced subtext output at 212, and the modification of the input subtext in the input text can improve the articulateness of the input text.

An embodiment can utilize a subtext output at 212, or at 214, to replace or modify one or more instances of the input subtext, received at 202, in an input text, and modifying the input subtext(s) with the subtext output from 212 or 214 can improve the articulateness of the input text. Alternatively, an embodiment can utilize a subtext output at 212, or at 214, to generate an enhanced text that can improve the articulateness of an input text. For example, an embodiment can perform a method such as illustrated by method 300 in FIG. 3, using a subtext output at 212 or 214.

Figure 3:
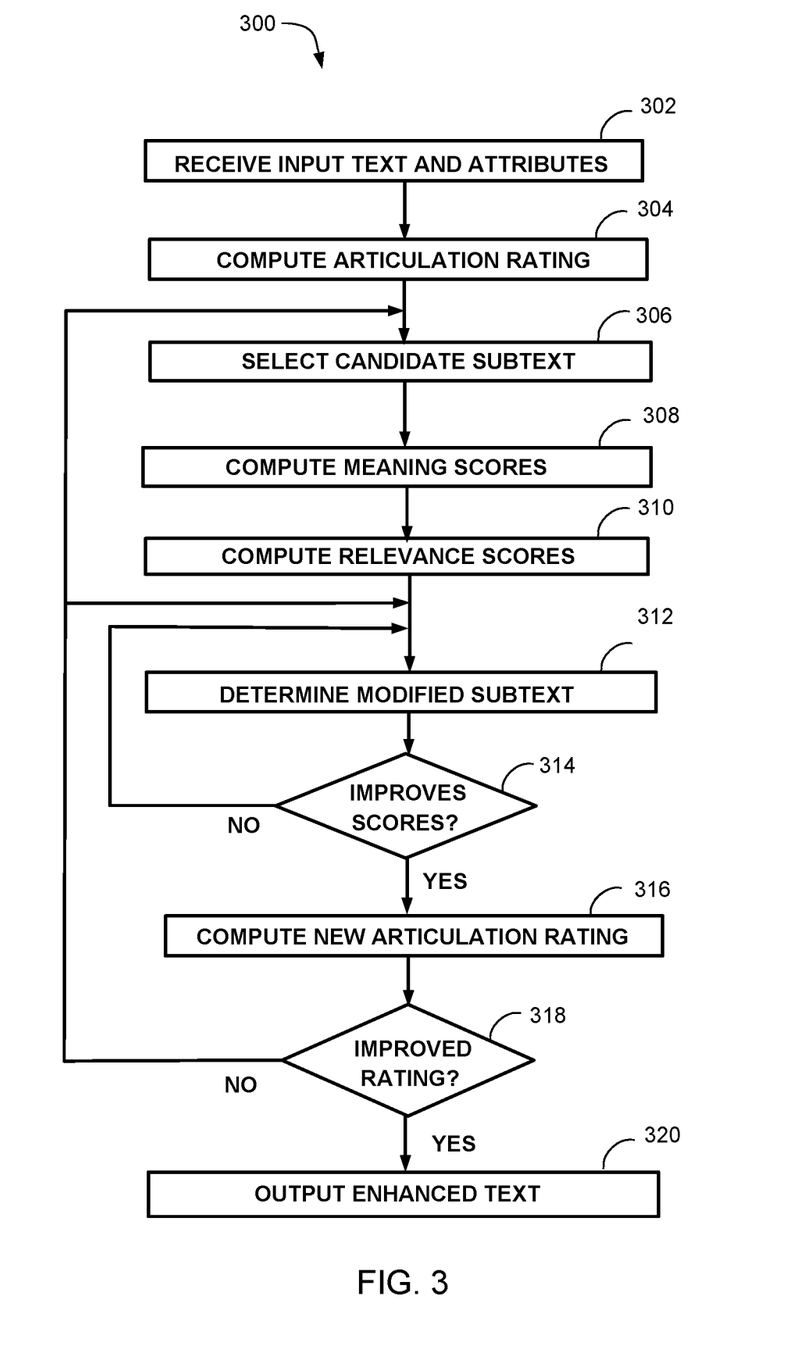
FIG. 3 illustrates an alternative example method for modifying an input text, according to aspects of the disclosure.

In FIG. 3, method 300 illustrates an example method of an embodiment to determine alternative subtexts to modify a subtext of an input text and output an enhanced text that can improve the articulateness of the input text. As in the descriptions of the example methods of FIGS. 1 and 2, to illustrate the example but not intended to limit embodiments, example method 300 is described as performed by a computer-implemented word processor. In embodiments, method 300 can be combined with, and/or utilize outputs of, methods 100 and/or 200 to modify a subtext of an input text to generate and output an enhanced text.

At 302 of example method 300, the word processor receives an input text and attributes associated with that input text. In an embodiment, an input text can comprise a computerized form of a text such as an electronic document, an email, or a text message. Additionally, or alternatively, an input text can comprise a subset of an input text, or can comprise a subtext, such as a subtext included in an input text and/or a subtext output from a method such as example methods 100 and 200 of FIGS. 1 and 2.

In embodiments, attributes received at 302 can include author attributes (e.g., attributes associated with an author of an input text), audience attributes (e.g., attributes associated with an audience of an input text), and/or rhetorical attributes (e.g., attributes associated with the rhetorical nature or elements of the input text). Author attributes can, in embodiments, include historical usage of subtexts (e.g., particular words, phrases, or symbolic or foreign subtexts). In another example, in embodiments author and/or rhetorical attributes can comprise stylistic preferences, and/or rhetorical tones, associated with an author of an input text received at 302. In embodiments, stylistic preferences can include writing styles, such as expository, descriptive, persuasive, and/or narrative writing styles.

In embodiments, an audience of an input text, received at 302, can be one or more individual persons, and/or an institution or corporation, intended to receive, read, or otherwise process the input text. An audience of an input text, in an embodiment, can be a computer application that can receive a text as an input (either in its original form, as input to 302, or as output by a method such as 300). Accordingly, in an embodiment audience attributes can comprise, for example, identities of recipients or intended readers of an input text; relationships between an author of an input text and an audience of that text; and/or rhetorical tones preferred by, and/or appropriate to an audience (e.g., based on relationships of an author and an audience).

Rhetorical attributes, in embodiments, can be associated with an input text received at 302. Such rhetorical attributes can include writing styles (such as just described in reference to author attributes) and/or rhetorical tones associated with the input text. Rhetorical tones of an input text, in an embodiment, can be an informal or formal tone. In embodiments rhetorical attributes can include frequencies, and/or preferred frequencies, of particular subtexts, such as frequency of occurrence of particular subtexts in the input text, and/or in alternative texts that can be utilized, in an embodiment, in performing a method such as 300.

In embodiments a word processor can, at 302, receive an input text and determine (e.g., compute) attributes of an input text, such as author, audience, and/or rhetorical attributes. In embodiments, a word processor can compute such attributes based on, for example, aspects and/or elements of the input text (e.g., subtexts and/or metadata associated with an input text), an author of an input text, and/or an audience of an input text.

At 302, an embodiment can utilize natural language processing, machine learning, and/or relationship and/or social media analysis, for example, to determine author, audience, and/or rhetorical attributes. For example, an embodiment can determine rhetorical attributes (e.g., at 302), such as natural language meaning and/or a subject of an input text, using natural language processing applied to a portion (e.g., one or more subtexts, sentences, paragraphs, and/or document parts, such as a title or table of contents) of the input text. An embodiment can determine author, audience, and/or rhetorical attributes (e.g., a rhetorical tone) using, for example, relationship algorithms and social network analysis applied to an author and/or audience of the input text.

At 304 the word processor computes an "articulation rating" associated with the input text. In embodiments an articulation rating can correspond to the articulateness of the input text, and/or to a natural language correspondence between a text (e.g., an input text received at 302) and author, audience, and/or rhetorical attributes associated with that text. For example, in an embodiment an articulation rating can be a numerical value corresponding to, or based on, for example, clarity of natural language meaning of an input text, and/or natural language correspondence of an input text to particular rhetorical attributes, author attributes, and/or audience attributes.

To compute an articulation rating, at 304, an embodiment can utilize natural language processing, such as natural language semantic analysis, natural language understanding, speech-tagging, and/or statistical modelling methods and/or technologies. In embodiments, natural language processing Application Programming Interfaces (APIs) can, for example, output a numerical value corresponding to natural language meaning of a text (e.g., an input text or subtext) and/or natural language aspects of a text (e.g., relevance of a subtext to a larger portion of an input text). In embodiments, such numerical output values can comprise an articulation rating, or can be used to compute an articulation rating. For example, at 304 an embodiment can input a text to a natural language processing API and receive a numerical output value corresponding to the articulateness of the input text.

In another example, at 304 an embodiment can perform multi-criteria decision (MCD) analysis (such as the Technique for Order of Preference by Similarity, or "TOPSIS" method) to derive a numerical articulation rating for the input text. Such MCD analysis can, for example, convert non-numerical inputs (e.g., an input text and/or author, audience, and rhetorical attributes) to numerical values using proportional and relative weights of natural language aspects of the inputs. Embodiments can derive a numerical articulation rating for an input text based on a deviation of an MCD output value, computed for an input text, from an MCD output value computed for one or both of a positive and/or negative model text.

In an embodiment, a "positive" model text can comprise a text having a natural language meaning similar to that of an input text and that results in a particular "high" (e.g., a theoretical maximum) numerical value under MCD analysis. Similarly, a "negative" model text can comprise a text having a natural language meaning similar to that of an input text and results in, for example, a particular, "low" (e.g., a theoretical minimum) numerical value under MCD analysis. Accordingly, an embodiment can derive an articulation rating for an input text based on a comparison of an MCD output numerical value with those of the positive and negative model texts.

At 306, the word processor determines a candidate subtext, in the input text, to analyze for possible modification, in the input text, using a modified subtext. In embodiments, a word processor can select a particular subtext as a candidate subtext or, alternatively, can determine a set of key subtexts in the input text and select a candidate subtext from among the set of key subtexts. At 306 an embodiment can identify and/or select a candidate subtext or a set of key subtexts, based on, for example, a frequency of occurrence of a subtext in the input text (and/or a frequency of occurrence in alternative texts, such as "model" texts that can correspond to improved or, poorer, articulation ratings); availability of particular, or number, of synonyms of a candidate or key subtext; and/or a correspondence of a candidate or key subtext with author, rhetorical, and/or audience attributes received at 302.

At 308 the word processor selects a candidate sentence, within the input text, that includes the candidate subtext selected at 306, and computes a natural language "meaning score". In embodiments, a meaning score can correspond to a natural language meaning of the sentence, and/or a paragraph of the input text that includes the sentence. To compute a meaning score an embodiment can utilize natural language processing and/or APIs, such as described in reference to computing an articulation rating at 304. In an embodiment, at 308 a meaning score can be a numerical value representing a correlation between a natural language meaning of the sentence and a natural language meaning, and/or subject, of the paragraph, and/or a natural language meaning of the paragraph and a natural language meaning, and/or subject, of the input text. Such numerical values, in an embodiment, can quantify a natural language meaning of the sentence, and/or a natural language meaning of a paragraph of a text that includes the sentence. For example, at 308 an embodiment can input a candidate subtext, and/or a sentence or portion of an input text including the candidate subtext, to a natural language processing API and receive a numerical output value corresponding to a natural language meaning of the candidate subtext.

At 310 the word processor computes a natural language "relevance score" for the candidate subtext selected at 306. In embodiments, a relevance score can correspond to a relevance of the candidate subtext to a natural language meaning of the sentence, and/or of a paragraph of the input text that includes the sentence. In an embodiment a relevance score can be, for example, a numerical value representing a correlation between a natural language meaning of the subtext and a natural language meaning of a sentence, a subject of a sentence of an input text that includes the subtext, and/or a natural language meaning and/or subject of a paragraph of an input text that includes the sentence. To compute a numerical relevance score, at 310 an embodiment can utilize natural language processing and/or APIs, such as described in reference to computing an articulation rating at 304 and a meaning score at 308. For example, at 310 an embodiment can input a candidate subtext, and/or or portion of an input text (e.g. a sentence or a paragraph) including the candidate subtext, to a natural language processing API and receive a numerical output value corresponding to a relevance of the candidate subtext to a natural language meaning of the sentence, and/or the portion of the input text.

At 312 the word processor determines a "modified subtext" that can modify the candidate subtext in the sentence, and/or paragraph, selected at 308. At 312 an embodiment can determine a modified subtext based on author, audience, and/or rhetorical attributes received, or computed, at 302. At 312, "determining" a modified subtext can include computing a modified subtext, such as by combining alternative, or modifying subtexts, together with or, alternatively, in place of a candidate subtext selected at 306.

An embodiment can determine, at 312, a modified subtext using, for example, natural language analysis of a candidate subtext, a sentence of an input text including the candidate subtext, and/or alternative subtexts (which can include natural language representations of a symbolic or foreign language candidate subtext, and/or the candidate subtext modified grammatically or rhetorically). Using such natural language processing, a word processor can determine a "best-fit" alternative subtext as a modified subtext, in which the best-fit criteria corresponds, for example, to a natural language meaning of the candidate subtext, a natural language meaning of the sentence that includes the candidate subtext, and/or a natural language meaning of the alternative subtext.

In embodiments, a modified subtext can be, for example, a synonym of the candidate subtext or a synonym of a component of the candidate subtext (e.g., a synonym of one or words of a phrase or sentence subtext). In another example, a modified subtext can be a subtext (e.g., an adjective or adverb) that grammatically and/or rhetorically modifies the candidate subtext, and/or a natural language meaning of the candidate subtext. A modified subtext can include the candidate subtext or, alternatively, can replace the candidate subtext, in an input text (e.g., in a sentence of the input text containing the candidate subtext). An embodiment can employ a database, a lexicon, a network source, subtexts previously used by an author of the input text, machine learning, and/or natural language processing to select alternative subtexts. In yet another example, a modified subtext can be a subtext that modifies a foreign or symbolic subtext, such as a subtext output at 212 of method 200 in FIG. 2.

At 314, using the modified subtext generated at 312, the word processor computes new meaning and/or relevance scores corresponding to the modified subtext and determines if the modified subtext improves one or both scores. As previously described, in an embodiment a modified subtext can modify a candidate subtext by replacing the candidate subtext with the modified subtext, or combining (e.g., grammatically and/or rhetorically) an alternative subtext and the candidate subtext in a sentence of an input text. In embodiments a meaning score can correspond to a meaning of a sentence that includes the modified subtext in place of, or in combination with, the candidate subtext in that sentence. Similarly, in embodiments a relevance score can correspond to a relevance of a modified subtext to a sentence that includes the modified subtext in place of, or in combination with, the candidate subtext in that sentence, and/or to a paragraph that includes the sentence containing the modified subtext. At 314 an embodiment can compute new meaning and/or relevance scores in a manner similar to that described in reference to 308 and 310.

At 314, the word processor further determines if the meaning and/or relevance scores computed using the modified subtext are improved relative to the respective meaning and/or relevance scores computed at 308. As previously described, a meaning and/or relevance score can be a numerical value and, accordingly, in an embodiment a new meaning or relevance score computed at 314 can improve over a meaning or relevance score, computed at 308 or 310, respectively, based on the new score being numerically greater or, alternatively, numerically lessor, than a score computed at 308 or 310.

If, at 314, the word processor determines that the modified candidate text does not improve the meaning and/or relevance scores, at 312 the word processor can repeat 312 and 314 using another alternative subtext. While not shown in FIG. 3, in repeating 312 and 314, an embodiment can determine, at 312, that there are no additional alternative subtexts, and at 312, in lieu of performing 314, can repeat 306-314 or, alternatively, discontinue performing method 300.

Alternatively, if, the word processor, at 314, determines that the modified candidate text improves the meaning and/or relevance scores, at 316 the word processor generates an enhanced text based on the input text using the modified subtext determined at 312 as applied at 314, and computes a new articulation rating corresponding to the enhanced text. Embodiments can, at 316, compute a new articulation rating for the enhanced text in a manner similar to that described in reference to operation 304 to compute the articulation rating for the input text received at 302.

In computing an articulation rating, such as at 304 and/or 316 of method 300, an embodiment can use natural language processing to determine a natural language meaning of an input text and/or an enhanced text, and/or a natural language subject of an input text and/or an enhanced text. Determining such natural language meanings and/or subjects can aid an embodiment to compute a correspondence between a text, and/or a subtext, and attributes of, or associated with, a text and/or a subtext, and/or to compute a numerical articulation rating based on such a correspondence.

At 318 the word processor determines if the enhanced articulation rating, computed at 316 in association with the enhanced text, improves over the input articulation rating, computed at 304 in association with the input text. In an embodiment, as previously described an articulation rating can be a numerical value and, in an embodiment, an enhanced articulation rating computed at 316 can improve over the input articulation rating computed at 304 based on the enhanced articulation rating being numerically greater than or, alternatively, numerically lessor than, the input articulation rating.

If the word processor determines, at 318, that the enhanced articulation rating improves over the input articulation rating, at 320 the word processor outputs the enhanced text generated at 316. Alternatively, if, at 318, the word processor determines that the new articulation rating does not improve over the articulation rating computed at 304, the word processor can repeat 312-318 or, alternatively, 308-318. In repeating, at 318, operations 312-318 or 308-318, an embodiment can repeat the operations using the input text received at 302 or, alternatively, an enhanced text generated at 316.

In embodiments, the enhanced text output at 320 can be incorporated into an input text or, alternatively can replace an input text, such as received at 302. While not shown in FIG. 3, in lieu of, or in addition to, outputting an enhanced text at 320, an embodiment can, at 320, repeat operations 304-318 using the enhanced text generated at 316.

Embodiments can include a system that can analyze a subtext and output a modified subtext, and/or can analyze an input text and generate an enhanced text, such as illustrated by example methods 100, 200, and/or 300 of FIGS. 1, 2, and 3, respectively. Accordingly, FIG. 4 illustrate example word processing system 400 that can embody elements and/or operations of the disclosure.

Figure 4:
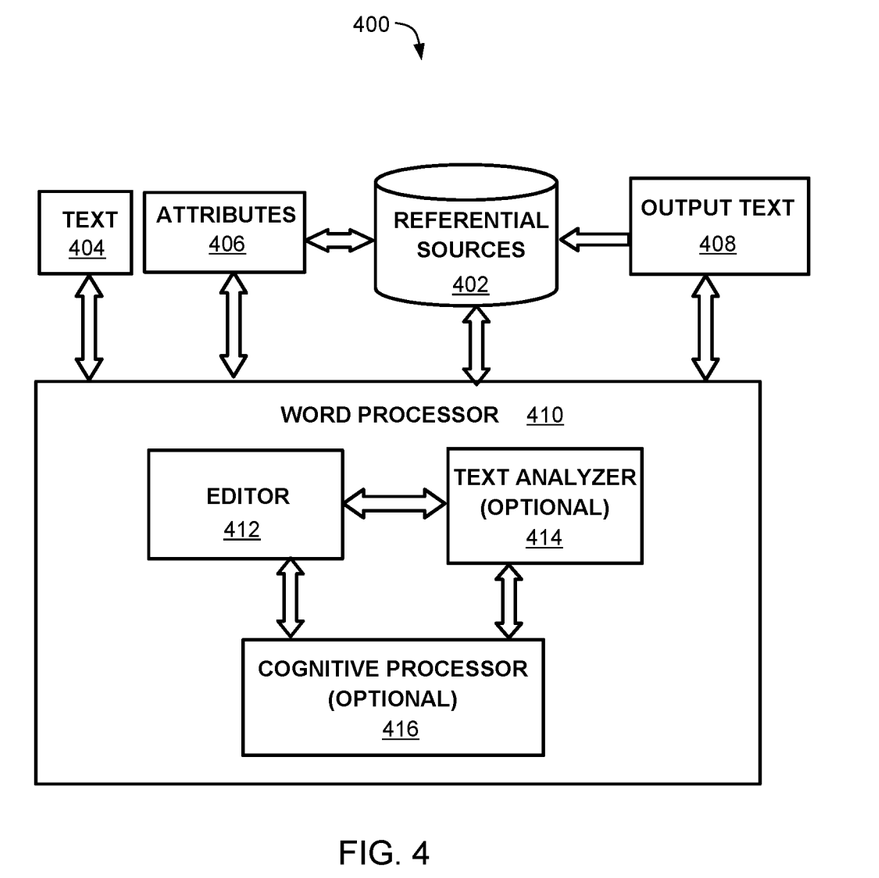
FIG. 4 illustrates an example word processing system, according to aspects of the disclosure.

In FIG. 4, word processing system 400 comprises word processor 410, referential sources 402, text 404, attributes 406, and output text 408. FIG. 4 further illustrates text editor 412 and optional elements text analyzer 414 and cognitive processor 416 as components of word processor 410. In embodiments, text 404 can comprise an input text, and/or a subtext, such as previously described. Attributes 406, in embodiments, can comprise author, audience, and/or rhetorical attributes, such as also previously described. In an embodiment, word processor 410 can receive such attributes and/or can compute such attributes. Output text 408, in an embodiment, can comprise a modified subtext and/or an enhanced text, such as previously described. Output text 408, in an embodiment, text can include a history record such as described in reference to method 100 of FIG. 1.

Referential sources 402, in embodiments, can comprise information sources that can be used by word processor 410, and/or components thereof, to analyze and/or modify an input text. For example, in an embodiment referential sources can include: lexicons; dictionaries; grammatical and/or rhetorical guides; foreign language translations; graphical and/or symbolic subtexts; journals, treatises, and/ or reference texts; Internet media; and/or, contact and/or social network information associated with an author and/or audience of a text. In embodiments word processor 410 can use referential sources 402, for example, to determine domain and/or natural language meaning of a foreign or symbolic subtext, such as in method 200 of FIG. 2. Similarly, in an embodiment, word processor 410 can use referential sources 402 to determine natural language meaning of a subtext, to identify alternative subtexts, to analyze author and audience relationships, to select candidate subtexts in an input text, and/or to compute articulation ratings, subtext meaning scores, and/or subtext relevance scores.

In an embodiment referential sources 402, text 404, attributes 406, and/or output text 408 can be included in a system (e.g., a database, or a computer) coupled to word processor 410 and word processor 410 can access these by means of an interface (not shown in FIG. 3) coupling the system and word processor 410. Alternatively, while not shown as such in FIG. 3, word processor 410 can include referential sources 402, text 404, attributes 406, and/or output text 408.

In embodiments word processor 410 can comprise any form of computer-implemented system capable of performing word processing functions, such as the example methods of FIGS. 1, 2, and 3. For example, in an embodiment word processor 410 can comprise a laptop or desktop computer, a mobile device, a mainframe computer, a network of such computing devices, and/or computing applications of such devices and systems. In another example, in an embodiment word processor 410 can comprise one or more special purpose computing systems and/or processors, such as neural networks, cognitive computers, computing systems, and/or applications of such systems, such as natural language and/or cognitive processing. Such elements, in an embodiment, can be hardware components, software or firmware components, or combinations thereof, in a computing system.

Components of word processor 410 (e.g., editor 412, text analyzer 414, and/or cognitive processor 416), in embodiments, can collectively, and/or individually, perform operations and/or methods of the disclosure, such as illustrated by the example methods of FIGS. 1, 2, and 3. For example, in an embodiment text 404 can be an input text or, alternatively, an input subtext and editor 412 and/or text analyzer 414 can perform method 100, or operations thereof, to record a history of changes to text 404 and facilitate a user modifying the text 404, using the history, to generate and/or output an enhanced text as output text 408.

In another example, text 404 can be a subtext of an input text and components of editor 412 and/or text analyzer 414 can perform method 200, or operations thereof, to determine that the subtext is a foreign or symbolic subtext, analyze the subtext to determine an alternative natural language subtext, or generate and/or output an enhanced subtext as output text 408. In yet another example, text 404 can be an input text and editor 412 and/or text analyzer 414 can perform operations of the foregoing example methods 100, 200, and/or 300 to analyze subtexts in text 404, such as to determine a natural language meaning and/or alternative subtext for an input or candidate subtext received as text 404.

Cognitive processor 416, in an embodiment, can be a component of a computing system that can perform cognitive computing functions, such as natural language semantic analysis and/or other forms of natural language understanding; relationship and/or social network analysis of an author and/or audience of a text; and/or determining rhetorical attributes of a text. For example, in an embodiment text 404 can be an input text, or a subtext of an input text, and cognitive processor 416 can perform natural language processing of text 404; a sentence or paragraph included in text 404 (e.g., a sentence including a candidate subtext); a modified subtext and/or an enhanced text (e.g., a modified subtext and/or an enhanced text generated by components of word processor 410); and/or, a sentence or paragraph included in an enhanced text. In such an embodiment, a cognitive processor can determine natural language meanings, relevance, and/or articulation scores of such texts. In embodiments, a cognitive processor, such as 416, can be a computing system or, can comprise a hardware component, a software component, or a combination thereof, of a computing system capable of performing cognitive functions.

In an embodiment, components of word processor 410, such as illustrated in FIG. 3, can collaboratively perform operations and/or methods of the disclosure. Alternatively, in an embodiment, a single component of word processor 410, such as editor 412, can perform these functions. While FIG. 3 illustrates editor 412, text analyzer 414, and cognitive processor 416 as distinct, individual elements of word processor 410, this is for only purposes of illustrating the disclosure and is not intended to limit embodiments. It would be apparent to one of ordinary skill in the art that, in an embodiment, any of editor 412, text analyzer 414, and cognitive processor 416, illustrated in the example of FIG. 3, can be combined, in any form and/or function, within a word processing system such as illustrated by the example of word processing system 400. For example, in an embodiment, editor 412 can include and/or perform functions of one or both of text analyzer 414 and cognitive processor 416, and/or operations of example methods 100, 200, and 300 of FIGS. 1, 2, and 3, respectively. It would be further apparent to one of ordinary skill in that art that, in an embodiment, any of editor 412, text analyzer 414, and cognitive processor 416 can be included in an alternative computing system, other than word processor 410, and that word processor 410 can be coupled (e.g., by an interface such as a communications network and/or software protocol) to such an alternative computing system to perform the operations and/or methods of the disclosure.

In embodiments, a word processing system, and/or word processor, capable of performing operations and methods of the disclosure, such as illustrated by the example of word processing system 400 and word processor 410, can be computer-implemented. Accordingly, FIG. 5 illustrates an example computing system, 500, which can implement, in an embodiment, a word processing system, a word processor, and/or components of these, such as described in the foregoing examples of the disclosure (e.g., word processing system 400 and/or word processor 410 of FIG. 4) to perform operations and/or methods of the disclosure.

Figure 5:
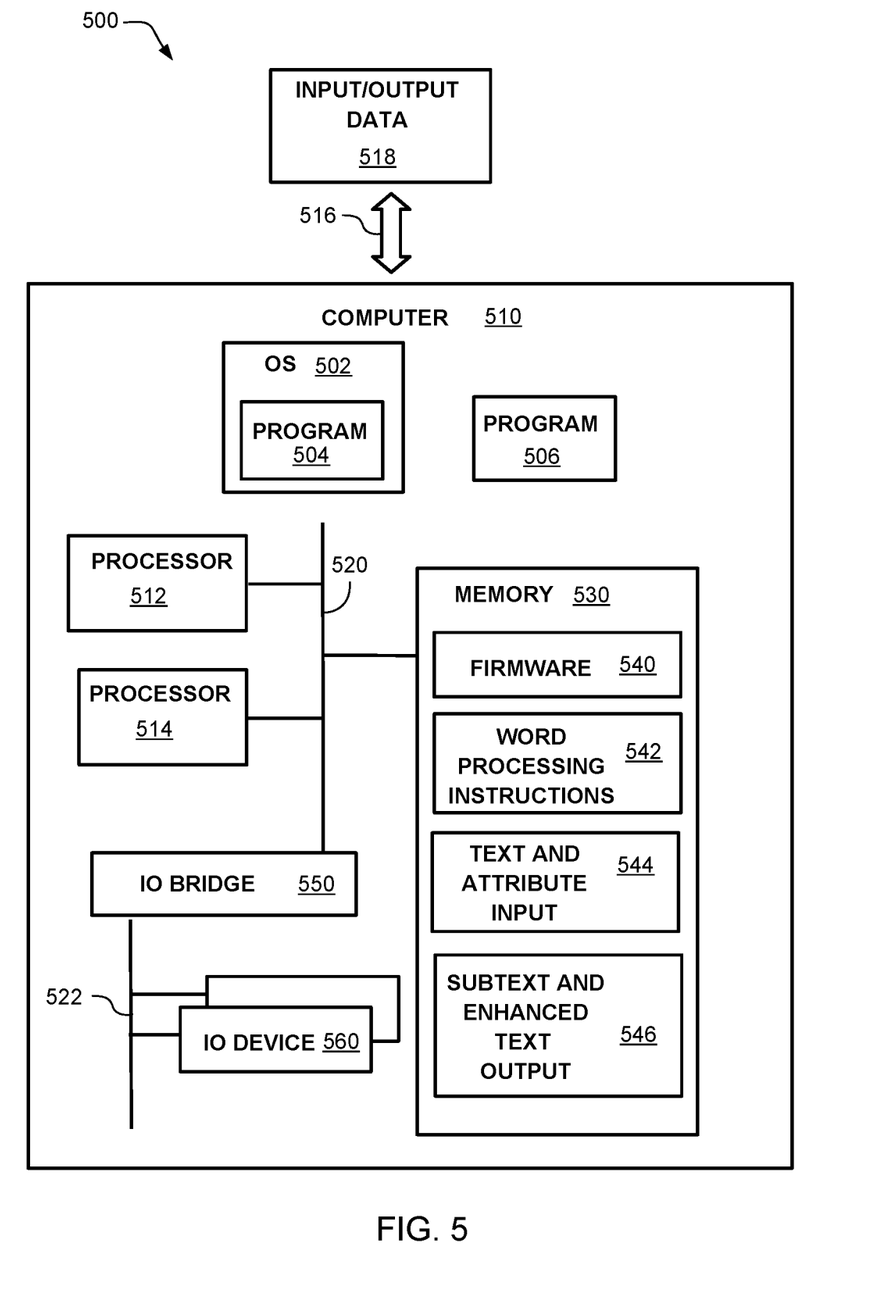
FIG. 5 illustrates an example word processor, according to aspects of the disclosure.

FIG. 5 depicts computing system 500 comprising computer 510 coupled by means of interface 516 to input/output data 518. In an embodiment, input/output data 518 can include, for example: an input text, a subtext, a modified subtext, and/or an enhanced subtext; author, audience, and/or rhetorical attributes; reference information (e.g., lexicons, dictionaries, journals, and reference texts); inputs and/or outputs of editors, text analyzers, natural language processors, and/or cognitive computing processors (e.g., as illustrated by the example of FIG. 4); and/or inputs and/or outputs of operations and/or methods of the disclosure, such as illustrated by the example methods of FIGS. 1, 2, and 3.

In embodiments, interface 516 can enable computer 510 to, for example, receive or otherwise access input data, included in input/output data 518, and/or to present or otherwise or output or communicate output data included in input/output data 518. In embodiments, interface 516 can comprise, and/or couple computer 510 to, for example, a network (e.g., an intranet, or a public network such as the Internet), or a storage medium, such as a disk drive or database system internal to, or otherwise coupled to, computer 510.

Interface 516 can be configured to enable human input, to output data to a human, and/or to couple computer 510 to other input and/or output devices, such as described later in regard to components of computer 510. It would be apparent to one of ordinary skill in the art that, in an embodiment, interface 516 can be any of a variety of interface types or mechanisms suitable for a computer, or a program operating in a computer, to receive or otherwise access input texts and/or subtexts; author, audience, and/or rhetorical attributes; and/or, to output or otherwise communicate alternative subtexts and/or enhanced texts.

As shown in FIG. 5, computing system 500 includes computer 510 having processors 512 and 514. In embodiments processors can be a single processor or a multi-threaded processor, a general purpose or a special purpose processor, a co-processor, or any of a variety of processing devices that can execute computing instructions.

In embodiments a computing device, such as computer 510, can include one or more memories and processors of a computing device can be coupled to the memories. FIG. 5 further illustrates processors included in computer 510 connected by memory interface 520 to memory 530. In embodiments a memory can be a cache memory, a main memory, a flash memory, or a combination of these or other varieties of electronic devices capable of storing information and, optionally, making the information, or locations storing the information within the memory, accessible to a processor. A memory, in an embodiment, can be formed of a single electronic (or, in some embodiments, other technologies such as optical) module or can be formed of a plurality of memory modules. A memory, and/or or a memory module (e.g., an electronic packaging of a portion of a memory), in an embodiment can be, for example, one or more silicon dies or chips, or can be a multi-chip module package. Embodiments can organize a memory as a sequence of bytes, words (e.g., a plurality of contiguous or consecutive bytes), or pages (e.g., a plurality of contiguous or consecutive bytes or words).

A computing device, such as computer 510, in embodiments, can be coupled to one or more memories by a memory interface, such as 520 in FIG. 5. A memory interface, such as 520, between a processor (or, processors) and a memory (or, memories) can be, for example, a memory bus common to one or more processors and one or more memories. In some embodiments, a memory interface, such as 520, between a processor and a memory can be point to point connection between the processor and the memory, and each processor in the computer can have a point-to-point connection to each of one or more of the memories. In other embodiments, a processor (for example, 512) can be connected to a memory (e.g., memory 530) by means of a connection (not shown) to another processor (e.g., 514) connected to the memory (e.g., 520 from processor 514 to memory 530).

In embodiments, a computing device, such as computer 510, can include an IO bridge, which can be connected to a memory interface, or (not shown), to a processor, for example. In some embodiments, an IO bridge can be a component of a processor or a memory. An IO bridge can interface the processors and/or memories of the computer (or, other devices) to IO devices connected to the bridge. For example, in FIG. 5 computer 510 includes IO bridge 550 interfacing memory interface 520 to IO devices, such as IO device 560. In some embodiments, an IO bridge can connect directly to a processor or a memory or can be a component included in a processor or a memory. An IO bridge can be, for example, a Peripheral Component Interface (PCI) Express or other IO bus bridge, or can be an IO adapter.

In embodiments an IO bridge can connect to IO devices by means of an IO interface, or IO bus, such as IO bus 522 of computer 510. For example, IO bus 522 can be a PCI-Express or other IO bus. In embodiments IO devices can be any of a variety of peripheral IO devices or IO adapters connecting to peripheral IO devices. For example, IO device 560 can be a graphic card, keyboard or other input device, a hard drive or other storage device, a network interface cards, etc. IO device 560 can be an IO adapter, such as a PCI-Express adapter, that connects components (e.g., processors or memories) of a computer to IO devices (e.g., disk drives, Ethernet networks, video displays, keyboards, mice, etc.).

In embodiments, a computing device can include instructions executable by one or more processors (or, processing elements, such as threads of a processor). The instructions can be a component of one or more programs. The programs, or the instructions, can be stored in, and/or utilize, one or more memories of a computer. As illustrated in the example of FIG. 5, computer 510 includes a plurality of programs, such as program 508 and program 504. In an embodiment a program can be, for example, an application program, an operating system or a function of an operating system, or a utility or built-in function of a computer. A program can be a hypervisor, and the hypervisor can, for example, manage sharing resources of the computer (e.g., a processor or regions of a memory, or access to an IO device) among a plurality of programs or OSes. A program can be a program that embodies the methods, or portions thereof, of the disclosure. A program can be a program that embodies the methods, or portions thereof, of the disclosure. For example, in an embodiment a program can be a program that executes on a processor of computer 510 to perform operations of example methods 100, 200, and/or 300 of FIGS. 1, 2, and 3, respectively.

In embodiments, programs can be "stand-alone" programs, and such stand-alone programs can execute on processors and use memory within a computing device directly, without requiring another program to control their execution or their use of resources of the computing device. For example, in FIG. 5 computer 510 includes stand-alone program 508. In an embodiment a stand-alone program can perform particular functions within the computer, such as controlling, or interfacing (e.g., access by other programs) an IO interface or IO device. A stand-alone program can, for example, manage the operation, or access to, a memory. A Basic I/O Subsystem (BIOS), or a computer boot program (e.g., a program that can load and initiate execution of other programs) can be a standalone program.

In embodiments a computing device can include one or more operating systems, and an operating system can control the execution of other programs such as, for example, to start or stop a program, or to manage resources of the computer used by a program. For example, computer 510 includes operating systems (OSes) 502 and 506, each of which can include, or manage execution of, one or more programs, such as OS 502 including (or, managing) program 504. In some embodiments, an operating system can function as a hypervisor.

A program can be embodied as firmware (e.g., BIOS in a desktop computer, or a hypervisor) and the firmware can execute on one or more processors and, optionally, can use memory, included in the computer. Firmware can be stored in a memory (e.g., a flash memory) of the computer. For example, computer 510 includes firmware 540 stored in memory 530. In other embodiments, firmware can be embodied as instructions (e.g., comprising a computer program product) on a storage medium (e.g., a CD ROM, a flash memory, or a disk drive), and the computer can access the instructions from the storage medium.

In embodiments, a memory of, or coupled to, a computing device can store instructions executable by a processor of a computing device. For example, as illustrated in FIG. 5, memory 530 includes firmware 540 and word processing instructions 542, which can, individually or collectively, include instructions executable by processors of computer 510 to perform operations and/or methods of the disclosure, such as operations of example methods 100, 200, and/or 300 of FIGS. 1, 2, and 3. For example, in embodiments firmware 540, programs 504 and/or 508, and/or word processing instructions 542 can include instructions to analyze an input text (e.g., compute articulation ratings, determine modified subtexts, and compute meaning and/or relevance scores) and/or produce a modified subtext and/or an enhanced text.

In embodiments, a memory of, and/or coupled to, a computing device can store input data, such as can be used by the instructions. For example, as also shown in FIG. 5, memory 530 includes text and attribute input 544. In an embodiment, text and attribute input 544 can include data (e.g., input text, subtext, and/or attribute data included in input/output data 518) used by word processing instructions 542 in performing operations and/or methods of the disclosure. Similarly, in an embodiment a memory of, and/or coupled to, a computing device can store output data, such as the results of executing the instructions. As illustrated in FIG. 5, memory 530 includes subtext and enhanced text output 546, which can be, in embodiments, the results of processors of computer 510 executing instructions to perform operations and/or methods of the disclosure.

The example computing system 500 and computer 510 is not intended to limit embodiments. In embodiments, computing system 500 can include a plurality of processors and/or interfaces not shown in FIG. 5 and can include other elements or components, such as networks, network routers or gateways, storage systems, server computers, virtual computers or virtual computing and/or IO devices, cloud-computing environments, and so forth. It would be evident to one of ordinary skill in the art to include a variety of devices interconnected in a variety of manners in a computing device and/or computing system embodying aspects and features of the disclosure.

For example, with reference again to FIG. 5, in embodiments computer 510 can be a desktop or laptop computer; a tablet computer, mobile computing device, or cellular phone; or, a server computer, a high-performance computer, or a super computer. Computer 510 can be, for example, a computing device incorporated into a wearable apparatus (e.g., an article of clothing, a wristwatch, or eyeglasses), an appliance (e.g., a refrigerator, or a lighting control), a mechanical device, or (for example) a motorized vehicle. It would be apparent to one of ordinary skill in the art that a computing device, and/or computing system, embodying aspects and features of the disclosure can be any of a variety of computing devices having processors and, optionally, memories and/or programs.

An embodiment can be a system, a method, and/or a computer program product at any possible technical detail level of integration. The computer program product can include a computer readable storage medium (or media) having computer readable program instructions thereon for causing a processor to carry out aspects of the disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the disclosure.

Aspects of the disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method, the method comprising a computer-implemented word processing system:
    receiving an input text;
    determining first text attributes, wherein the first text attributes are selected from an attributes group consisting of a writing style of an associated text, a rhetorical tone of the associated text, an author of the associated text, a historical usage of subtexts by the author of the associated text, a preferred frequency of occurrence of particular subtexts within the associated text, a preferred frequency of occurrence of particular subtexts within an alternative text, a first audience of the associated text, a natural language subject of the associated text, clarity of natural language meaning of the associated text, a natural language meaning of the associated text, and stylistic preferences associated with the author of the associated text, wherein the writing style of the associated text and the stylistic preferences are determined from among a plurality of alternative writing styles consisting of an expository style, a descriptive style, a persuasive style, and a narrative style, and wherein the first text attributes are determined using the input text as the associated text;
    computing, based on the input text and a first attribute among the first text attributes, a first articulation rating associated with the input text;
    selecting, to generate an enhanced text, a first candidate subtext included within the input text, the word processing system selecting the first candidate subtext based on a criterion selected from criteria consisting of a frequency of occurrence of the first candidate subtext within the input text, availability of particular synonyms of the first candidate subtext, a frequency of the first candidate subtext in an alternative text, a frequency of occurrence of the first candidate subtext within a model text, a number of available synonyms of the first candidate subtext, and a correspondence of the first candidate subtext with a second attribute among the first text attributes;
    generating, based on the first candidate subtext, a modified subtext;
    generating, using the modified subtext, the enhanced text;
    determining second text attributes, the second text attributes selected from the attributes group, the second text attributes determined using the enhanced text as the associated text;
    computing, based on the enhanced text and a third attribute, a second articulation rating associated with the enhanced text, the third attribute selected from among the first and the second text attributes;
    determining, based on a comparison of the first and second articulation ratings, that the second articulation rating improves over the first articulation rating; and,
    outputting, based on the second articulation rating improving over the first articulation rating, the enhanced text.

2. The method of claim 1, wherein the method further comprises the word processing system:
    receiving a selection input and a first history record, wherein the selection input comprises a type of a first edit operation and a scope of the first edit operation, wherein the scope of the first edit operation consists of one of the input text and a second candidate subtext, and wherein the first history record consists of first edits included in an edit history selected from a history group consisting of a history of all edits made to the input text, a history of edits made to the input text within a particular period of time, and a history of edits of the input text associated with the second candidate subtext;
    determining, based at least in part on the type of the first edit operation and the scope of the first edit operation, a second history record consisting of second edits from among the first edits included in the first history record;
    receiving a modification input corresponding to a second edit operation, the second operation to perform on the input text, the second edit operation based on the second history record; and wherein the word processing system generating the modified subtext comprises the word processing system generating the modified subtext based on the modification input.

3. The method of claim 1, wherein the word processing system computing the first articulation rating comprises the word processing system computing the first articulation rating based on a natural language correspondence between the input text and the first attribute; and,
  wherein the word processing system computing the second articulation rating comprises the word processing system computing the second articulation rating based on a natural language correspondence between the enhanced text and the third attribute.

4. The method of claim 1, wherein the first candidate subtext is selected from a group consisting of a foreign language word, a foreign language phrase, an abbreviation, a graphical symbol, a mathematical symbol, a mathematical equation, a chemical symbol, and a chemical equation; and,
  wherein the word processing system generating the modified subtext comprises the word processing system generating the modified subtext to comprise a natural language equivalent of the first candidate subtext.

5. The method of claim 1, wherein the word processing system generating the modified subtext comprises the word processing system generating the modified subtext based on a best-fit criterion selected from among: a natural language meaning of the first candidate subtext, a natural language meaning of a sentence of the input text that includes the first candidate subtext, and a natural language meaning of the modified subtext.

6. The method of claim 1, wherein the word processing system determining the first text attributes comprises the word processing system determining the first text attributes based, at least in part, on metadata associated with the input text.

7. The method of claim 1, wherein the word processing system computing the first articulation rating comprises the word processing system computing the first articulation rating based on a deviation of the input text from the model text; and,
  wherein the word processing system computing the second articulation rating comprises the word processing system computing the second articulation rating based on a deviation of the enhanced text from the model text.

8. The method of claim 1, wherein the first articulation rating comprises a respective first numerical value and the second articulation rating comprises a respective second numerical value; and,
  wherein the word processing system computing the first and the second articulation ratings comprises the word processing system computing the first and the second articulation ratings using Multi-Criteria Decision (MCD) analysis to derive the respective first and second numerical values.

9. The method of claim 8, wherein the word processing system using the MCD analysis to derive the respective first and second numerical values comprises the word processing system:
  performing the MCD analysis using proportional and relative weights of natural language aspects of the first text attributes to derive the respective first numerical value; and,
  performing the MCD analysis using proportional and relative weights of natural language aspects of the second text attributes to derive the second respective numerical value.

10. The method of claim 8, wherein the model text is selected from among a positive model text and a negative model text;
  wherein the method further comprises the word processing system using the MCD analysis to compute a numerical value of the model text;
  wherein the word processing system using the MCD analysis to derive the first respective numerical value comprises the word processing system using the MCD analysis to compute a numerical value of the input text and deriving the respective first numerical value based on a deviation of the numerical value of the input text from the numerical value of the model text and,
  wherein the word processing system using the MCD analysis to derive the respective second numerical value comprises the word processing system using the MCD analysis to compute a numerical value of the enhanced text and deriving the respective second numerical value based on a deviation of the numerical value of the enhanced text from the numerical value of the model text.

11. A system, the system comprising:
an input interface;
an output interface; and,
at least one processor communicatively coupled to the input interface and the output interface, wherein the at least one processor is configured to:
receive, via the input interface, an input text;
determine first text attributes from among an attributes group consisting of a writing style of an associated text, a rhetorical tone of the associated text, an author of the associated text, a historical usage of subtexts by the author of the associated text, a preferred frequency of particular subtexts in the associated text, a preferred frequency of occurrence of particular subtexts within an alternative text, a first audience of the associated text, a natural language subject of the associated text, a clarity of natural language meaning of the associated text, a natural language meaning of the associated text, and stylistic preferences associated with the author of the associated text, wherein the writing style of the associated text and the stylistic preferences are determined from among a plurality of alternative writing styles consisting of an expository style, a descriptive style, a persuasive style, and a narrative style, and wherein the at least one processor is further configured to determine the first text attributes using the input text as the associated text;
compute, based on the input text and a first attribute among the first text attributes, a first articulation rate associated with the input text;
select, to generate an enhanced text, a first candidate subtext included within the input text, wherein the at least one processor is further configured to select the first candidate subtext based on a criterion selected from among criteria consisting of a frequency of occurrence of the first candidate subtext within the input text, a number of available synonyms of the first candidate subtext, a frequency of the first candidate subtext in an alternative text, a frequency of occurrence of the first candidate subtext within a model text, availability of a particular number of synonyms of the first candidate subtext, and a correspondence of the first candidate subtext with a second attribute among the first text attributes;
generate, based on the first candidate subtext, a modified subtext;

generate, using the modified subtext, the enhanced text;
determine second text attributes from among the attributes group, wherein the at least one processor is further configured to determine the second text attributes using the enhanced text as the associated text;
compute, based on the enhanced text and a third attribute, a second articulation rating associated with the enhanced text, the third attribute selected from among the first and the second text attributes;
determine, based on a comparison of the first and second articulation ratings, that the second articulation rating improves over the first articulation rating; and,
output, via the output interface, based on the second articulation rating improving over the first articulation rating, the enhanced text.

12. The system of claim 11, wherein the at least one processor is further configured to:
receive, via the input interface, a selection input and a first history record, wherein the selection input comprises a type of a first edit operation and a scope of the first edit operation, wherein the scope of the first edit operation consists of one of the input text and a second candidate subtext, and wherein the first history record consists of first edits included in an edit history selected from a history group consisting of a history of all edits made to the input text, a history of edits made to the input text within a particular period of time, and a history of edits of the input text associated with the second candidate subtext;
determine, based at least in part on the type of the first edit operation and the scope of the first edit operation, a second history record consisting of second edits from among the first edits included in the first history record;
receive, via the input interface, a modification input corresponding to a second edit operation to perform on the input text, the second edit operation based on the second history record; and,
wherein the at least one processor configured to generate the modified subtext comprises the at least one processor further configured to generate the modified subtext based on the modification input.

13. The system of claim 11, wherein the at least one processor configured to compute the first articulation rating comprises the at least one processor further configured to compute the first articulation rating based on a natural language correspondence between the input text and the first attribute; and,
wherein the at least one processor configured to compute the second articulation rating comprises the at least one processor further configured to compute the second articulation rating based on a natural language correspondence between the enhanced text and the third attribute.

14. The system of claim 11, wherein the first candidate subtext is selected from a group consisting of a foreign language word, a foreign language phrase, an abbreviation, a graphical symbol, a mathematical symbol, a mathematical equation, a chemical symbol, and a chemical equation; and,
wherein the at least one processor configured to generate the modified subtext comprises the at least one processor further configured to generate the modified subtext to comprise a natural language equivalent of the first candidate subtext.

15. The system of claim 11, wherein the at least one processor configured to generate the modified subtext comprises the at least one processor further configured to generate the modified subtext based on a best-fit criterion selected from among: a natural language meaning of the first candidate subtext, a natural language meaning of a sentence of the input text that includes the first candidate subtext, and a natural language meaning of the modified subtext.

16. The system of claim 11, wherein the at least one processor configured to determine the first text attributes comprises the at least one processor further configured to determine the first text attributes based, at least in part, on metadata associated with the input text.

17. The system of claim 11, wherein the at least one processor configured to compute the first articulation rating comprises the at least one processor further configured to computing the first articulation rating based on a deviation of the input text from the model text; and,
wherein the at least one processor configured to compute the second articulation rating comprises the at least one processor further configured to compute the second articulation rating based on a deviation of the enhanced text from the model text.

18. The system of claim 11, wherein the first articulation rating comprises a respective first numerical value and the second articulation rating comprises a respective second numerical value; and,
wherein the at least one processor configured to compute the first and the second articulation ratings comprises the at least one processor further configured to compute the first and second articulation ratings using Multi-Criteria Decision (MCD) analysis to derive the respective first and second numerical values.

19. The system of claim 18, wherein the at least one processor configured to use the MCD analysis to derive the respective first and second numerical values comprises the at least one processor further configured to:
perform the MCD analysis using proportional and relative weights of natural language aspects of the first text attributes to derive the respective first numerical value; and,
perform the MCD analysis using proportional and relative weights of natural language aspects of the second text attributes to derive the respective second numerical value.

20. The system of claim 18, wherein the model text is selected from among a positive model text and a negative model text;
wherein the at least one processor is further configured to compute, using the MCD analysis, a numerical value of the model text;
wherein the at least one processor configured to use the MCD analysis to derive the respective first numerical value comprises the at least one processor further configured to use the MCD analysis to compute a numerical value of the input text and to derive the respective first numerical value based on a deviation of the numerical value of the input text from the numerical value of the model text; and,
wherein the at least one processor configured to use the MCD analysis to derive the respective second numerical value comprises the at least one processor further configured to use the MCD analysis to compute a numerical value of the enhanced text and to derive the respective second numerical value based on a deviation of the numerical value of the enhanced text from the numerical value of the model text.

* * * * *